(12) United States Patent
Rehill

(10) Patent No.: US 7,216,996 B2
(45) Date of Patent: May 15, 2007

(54) MIRROR WITH INTERCHANGEABLE APPEARANCE COVERS

(75) Inventor: Graham Rehill, Chichester (GB)

(73) Assignee: Schefenacker Vision Systems UK Ltd. (GB)

( * ) Notice: Subject to any disclaimer, the term of this patent is extended or adjusted under 35 U.S.C. 154(b) by 0 days.

(21) Appl. No.: 10/311,410

(22) PCT Filed: Jun. 15, 2001

(86) PCT No.: PCT/US01/19262

§ 371 (c)(1),
(2), (4) Date: Jun. 21, 2004

(87) PCT Pub. No.: WO01/96149

PCT Pub. Date: Dec. 20, 2001

(65) Prior Publication Data

US 2004/0233558 A1 Nov. 25, 2004

(51) Int. Cl.
*G02B 7/182* (2006.01)

(52) U.S. Cl. .................................................. 359/879

(58) Field of Classification Search ................. None
See application file for complete search history.

(56) References Cited

U.S. PATENT DOCUMENTS

| 4,125,244 | A | * | 11/1978 | Lukey | 248/475.1 |
|---|---|---|---|---|---|
| 4,678,295 | A | * | 7/1987 | Fisher | 359/874 |
| 4,740,068 | A | * | 4/1988 | Fisher | 359/874 |
| 4,915,493 | A | * | 4/1990 | Fisher et al. | 359/874 |
| 5,245,480 | A | * | 9/1993 | Polzer | 359/841 |
| 5,450,246 | A | | 9/1995 | Jain | |
| 5,477,390 | A | * | 12/1995 | Boddy et al. | 359/841 |
| 5,477,391 | A | * | 12/1995 | Boddy | 359/841 |
| 5,823,054 | A | * | 10/1998 | Brouwer | 74/425 |
| 6,132,050 | A | * | 10/2000 | Sakata et al. | 359/841 |
| 6,250,783 | B1 | | 6/2001 | Stidham et al. | |

FOREIGN PATENT DOCUMENTS

EP 0 644 084 A1 3/1995
JP 07 223489 A 8/1995

* cited by examiner

*Primary Examiner*—Drew A. Dunn
*Assistant Examiner*—Aline D McNaull

(57) ABSTRACT

A mirror system having a common framework that allows interchangeability of mirror styles. The mirror system includes a first skeleton support structure operatively attached to a portion of a vehicle. The support structure including a mounting bracket therein. A removable cover adapted to be attached thereover for providing a stylistic appearance to the bracket portion. A second support structure is provided for attachment to the bracket portion. A second support structure includes attachments for supporting a mirror assembly therein. The support assembly includes a connection structure. An outer interchangeable cover portion is provided, which is interchangeably fitted to the support structure for providing a variable stylistic outer surface to the mirror.

17 Claims, 6 Drawing Sheets

MIRROR WITH INTERCHANGEABLE APPEARANCE COVERS

CROSS-REFERENCE TO RELATED APPLICATIONS

The instant application claims priority from International Patent Application No. PCT/US01/19262, filed Jun. 15, 2001, and U.S. Provisional Patent Application Ser. No. 60/211,845, filed Jun. 15, 2000, the entire specifications of both of which are expressly incorporated herein by reference.

BACKGROUND AND SUMMARY OF THE INVENTION

The present invention relates to vehicle side view mirrors. More particularly, the present invention relates to a side view mirror assembly with interchangeable appearance covers, generally shown at 10 in the drawings.

The style, features and functions of vehicle side view mirrors have become increasingly important to both manufacturers and consumers in today's automotive and vehicle market. Typically, in the past, vehicle mirrors and features therein are designed for a particular model, with little, if any, interchangeability of parts.

A particular mirror design is designed specifically for a particular application with both mechanical features, such as a manually adjustable mirror or an electrically adjustable mirror, and stylistic design considerations being created for a single specific design. While these mirrors have been adequate, they require a separate manufacture for each type of design, whether foldable, manually adjustable or electrically adjustable or the like. Therefore, design changes either stylistically or feature-wise are hard to accomplish in a timely manner.

Thus, in the past, typically stylistic changes require entire rebuilds of the internal component and framework, along with the external stylistic changes. Therefore, it has been desirable to provide a system which will allow interchangeability of aesthetic features and various options. Preferably, the system would include a generic mirror control module over which various stylistic covers could be fitted to provide different stylistic looks to the mirror assembly.

SUMMARY OF THE INVENTION

In accordance with the present invention, there is provided a mirror system having interchangeable covers which fit over a common support structure. The mirror system includes a first skeleton support structure operatively attached to a portion of a vehicle. The support structure including a mounting bracket therein. A removable cover adapted to be attached thereover for providing a stylistic appearance to the bracket portion. A second support structure is provided for attachment to the bracket portion. A second support structure includes attachments for supporting a mirror assembly therein. The support assembly includes a connection structure. An outer interchangeable cover portion is provided, which is interchangeably fitted to the support structure for providing a variable stylistic outer surface to the mirror.

Therefore, the present invention allows interchangeability of the outer cover structure of the mirror or bracket while maintaining a common skeletal structure. This allows customization of the look and features found on or in the mirror. Customization as to the design for attachment to the door is also realized due to the interchangeable cover portions.

DETAILED DESCRIPTION OF THE PREFERRED EMBODIMENTS

Figure 1:
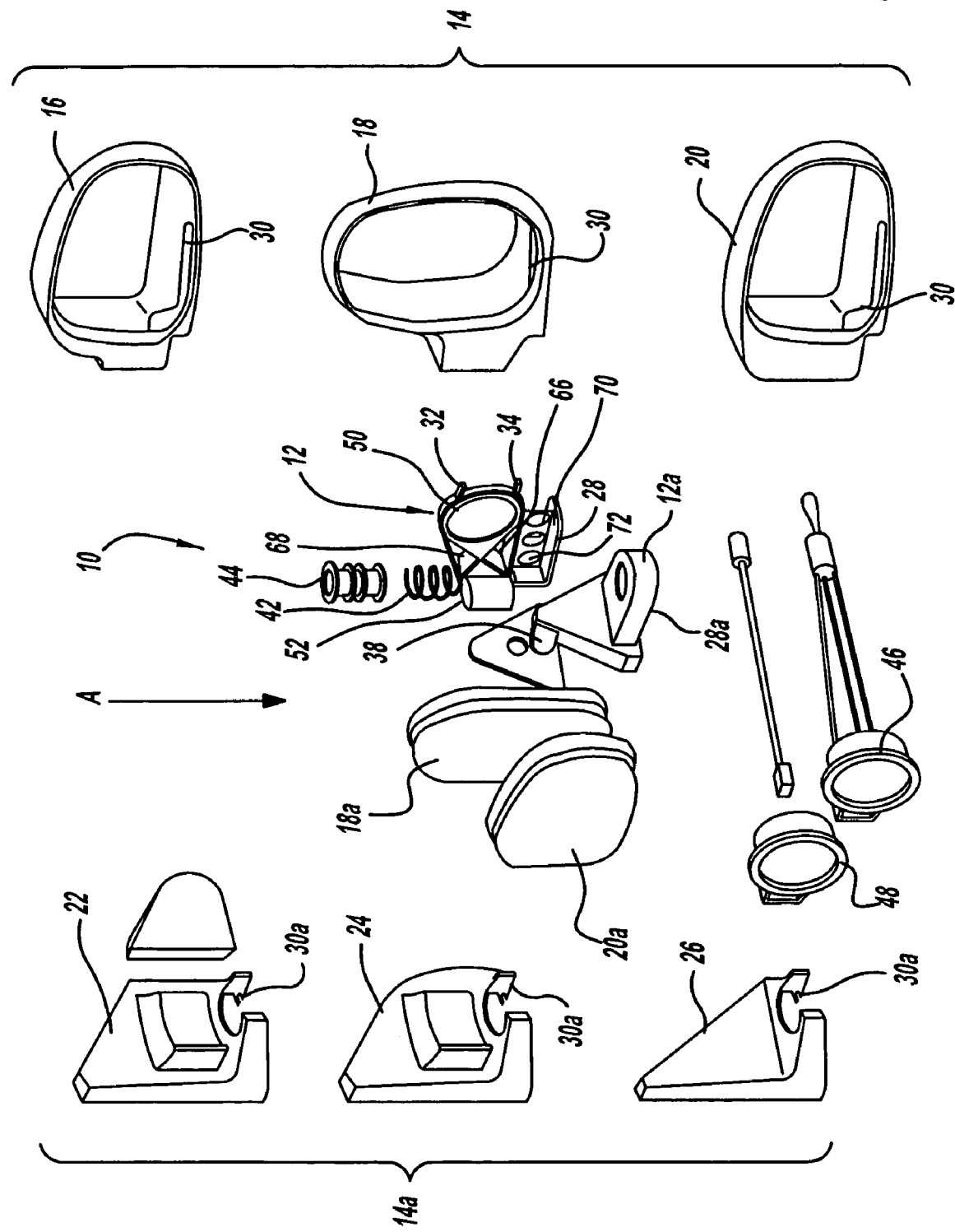
FIG. 1 is an exploded illustration showing a modular mirror system of the present invention.
Figure 2:
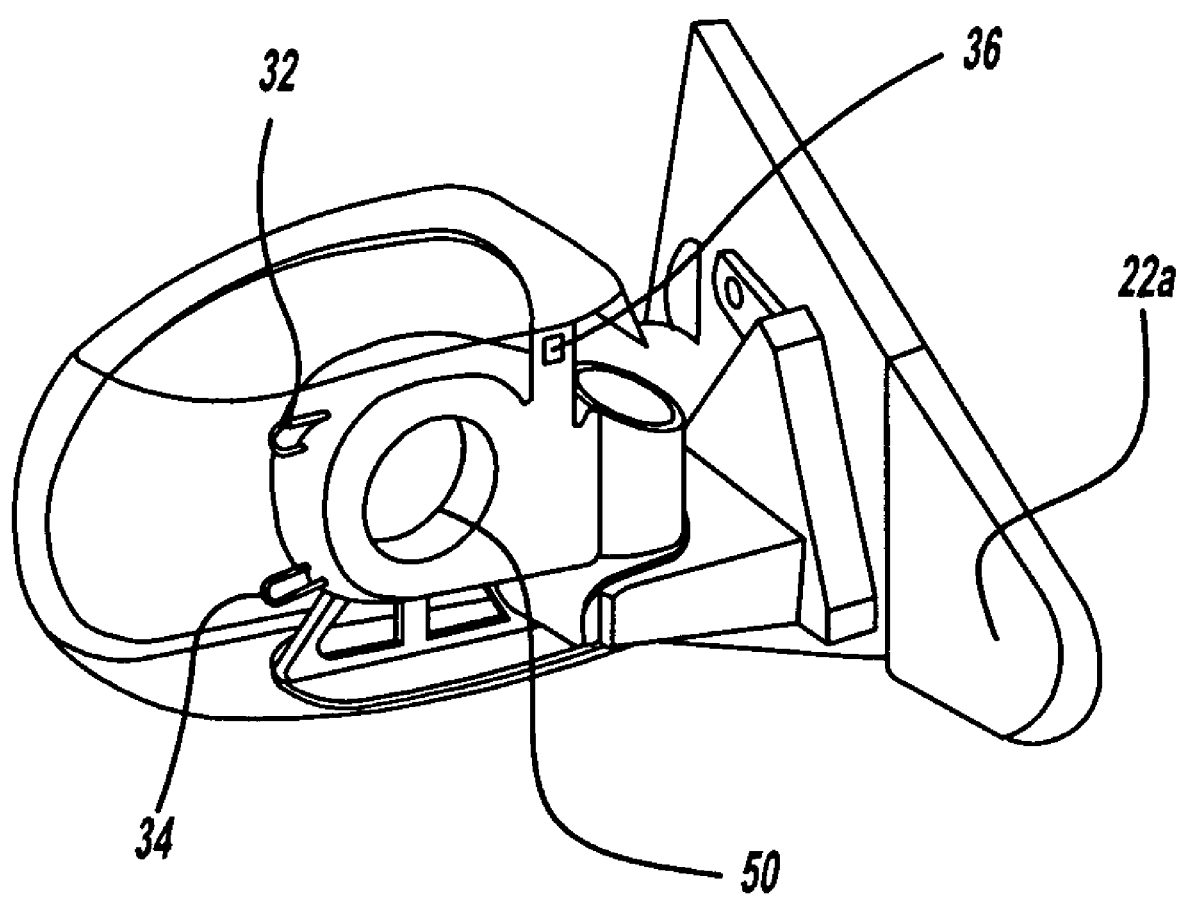
FIG. 2 is a phantom view of the mirror system of the present invention.

The system 10 includes inner structural member which are a mirror support portion 12 and a mounting bracket 12a, generally shown at 12, 12a. A first cover member 14 and second cover member 14a provide an outer stylistic appearance to the mirror. The cover members 14, 14a are interchangeable over the structure members 12, 12a from a first direction, generally shown by arrow A, and are snap fit on the lower member in a manner known in the art. A preferred embodiment includes a mounting bracket 12a and a mirror support portion 12. Interchangeable covers 16, 18, 20, for changing the appearance, may be attached over the mirror structure. Alternatively, door attachment covers 22, 22a, 24, 26 may be readily attached to a mounting bracket 12a for changing the appearance of the portion of the mirror which attaches to the car door, such as at the "sail" portion of the window. Thus, the internal components such as the foldable spring 42 and bushing 44 components could be used, or a modular powerfold mechanism could be interchangeably used, depending on the desired option. Additionally, mirror adjustment modular assemblies such as remote control electrical mirror assembly 46, remote control manual assembly 48, hard top adjustable mirror module assemblies, or mirror memory modules are interchangeable in the frame portion 50. Mirrors such as 18a and 20a are provided to match the covers 18 or 20 respectively.

The mounting bracket 12a or mirror support structure 12 include a lower plate 28 thereof, which becomes an outside show surface continuous with the cover after assembly. In a preferred embodiment, the cover is placed over the mounting bracket and mirror support portion 12 from the top, and then the opening in the cover matches a lower plate 28, which forms the lower outer surface of the assembled mirror structure.

Figure 6:
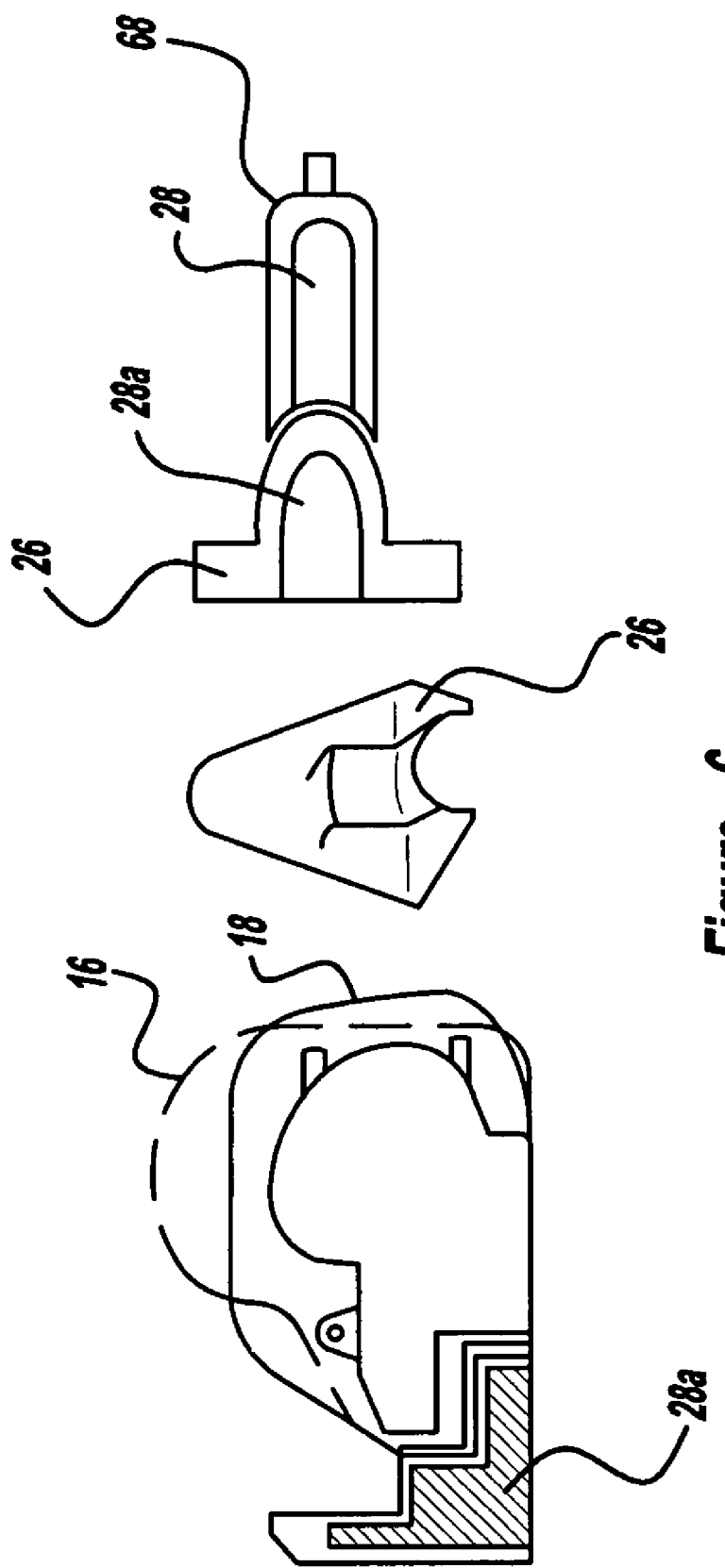
FIG. 6 is a bottom view of the mirror assembly of the present invention.

As can be seen from the drawings, the outer covers 16, 18, 20, 22, 24 or 26 all have apertures 30 or 30a in their base, which conform to lower plate 28 and attachment portion 28a for forming a continuous surface on the bottom of the mirror, which shows only a slight line about the periphery of the lower plate 28 or attachment portion 28a, as shown in FIG. 6.

Figure 3:
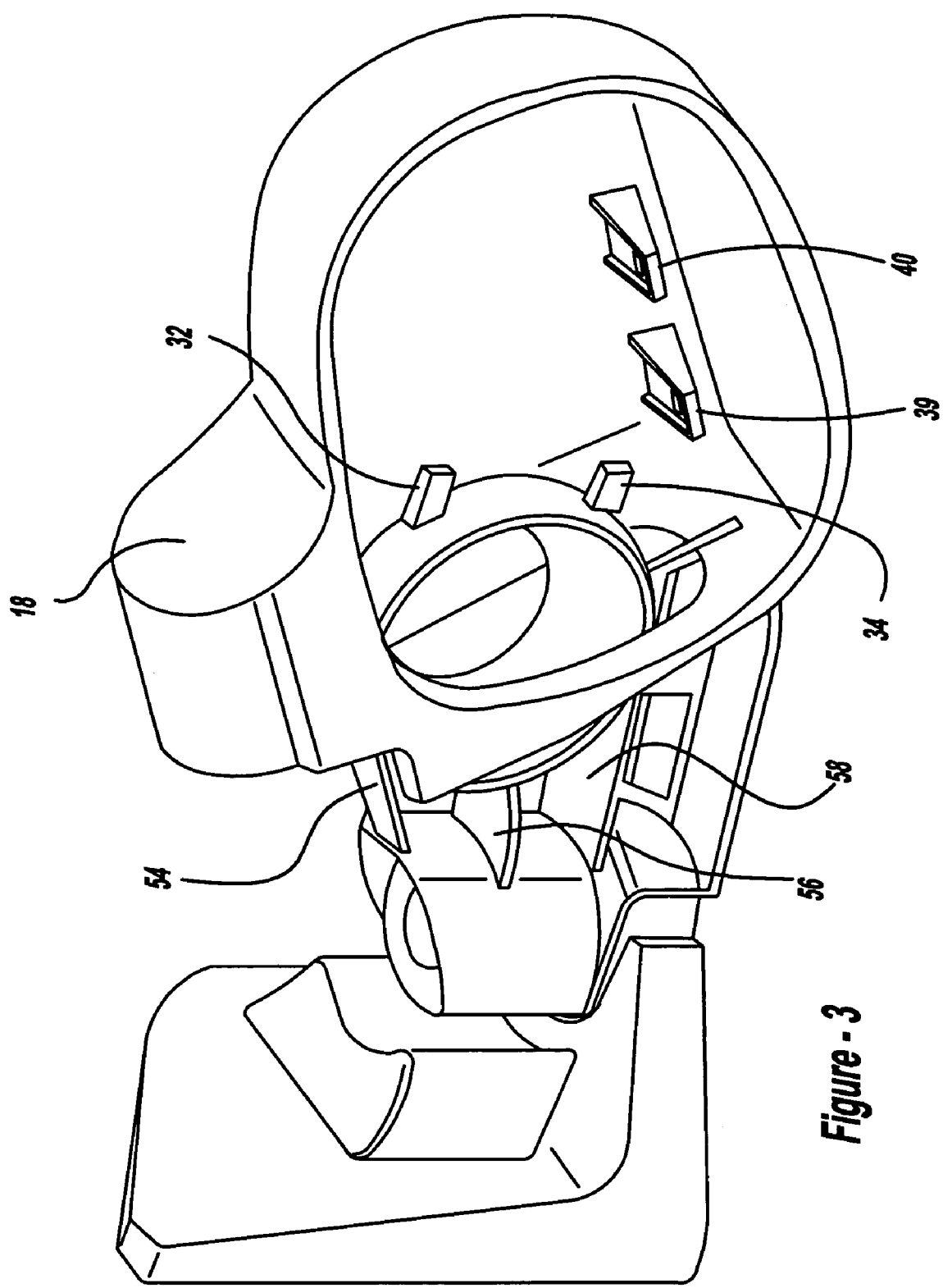
FIG. 3 is a perspective view showing attachment of the mirror cover to the support.
Figure 4:
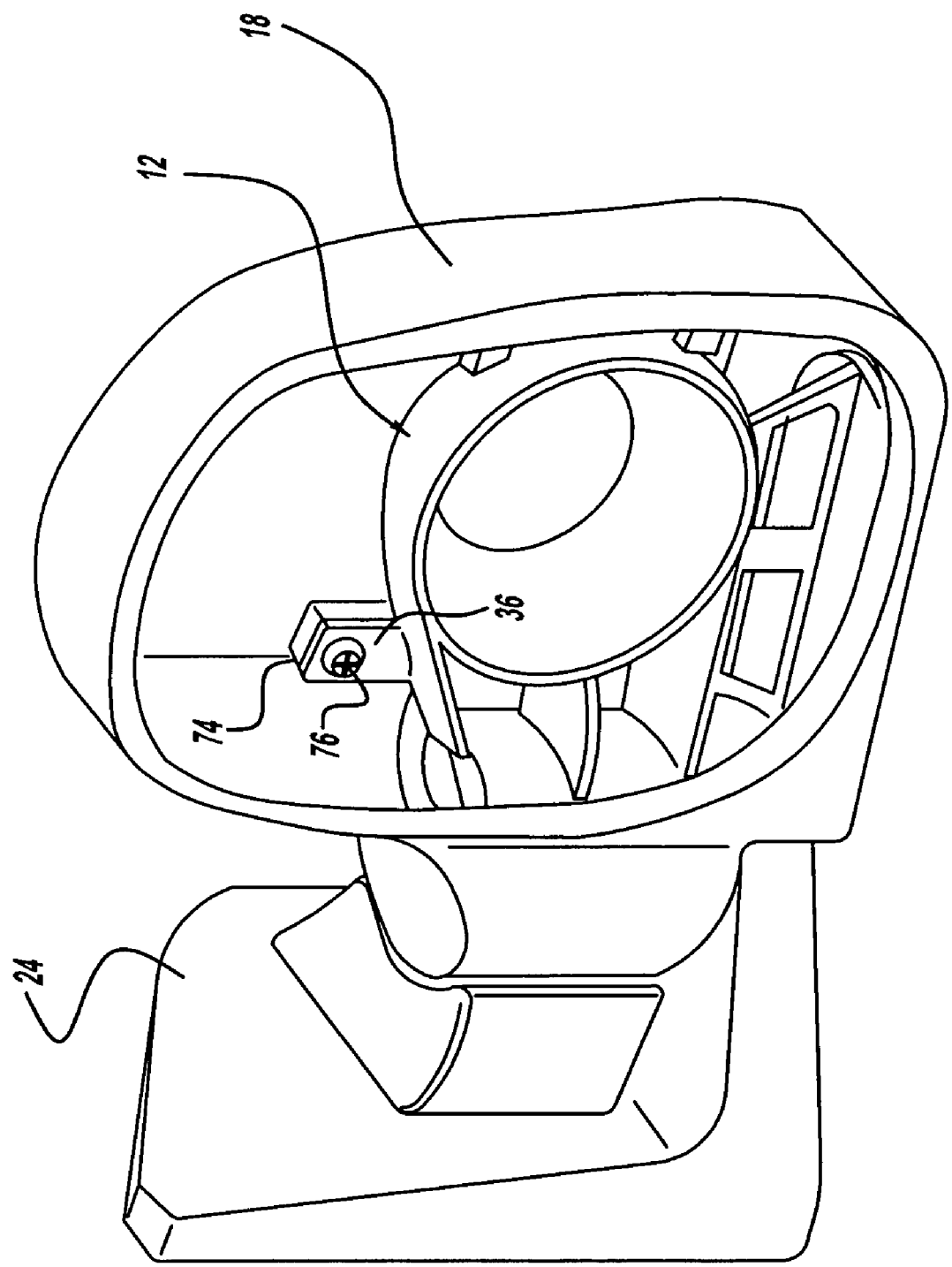
FIG. 4 is a perspective view showing the mirror cover attached to the mirror support.

The mirror support portion 12 includes attachment tabs 32, 34 and 36. The covers include vertical receiving structures 39 and 40. As best shown in FIGS. 3 and 4, the mirror cover 18 is applied over the mounting bracket 12a, first at an angle as shown in FIG. 3. The tab 34 is placed in receiving structure 39. The mirror cover is then rotated such that tab 32 engages receiving structure 40. Thereafter, the cover is rotated further until the opening 30 engages lower plate 28, as shown in FIG. 4. A fastener 76 is then inserted at tab 36 for attachment to a suitable flange 74 one the cover 18 for securing the cover 18 to the mirror support portion 12. This is a method used with tabs on the sides. It should be readily appreciated that the tabs could be placed on the top of mirror support portion 12, such that the vertical movement is all that is necessary for applying the mirror cover. Similarly, snap fit attachment, such as a latch in a tang or tongue in groove securement, could also be used for final securement.

Figure 5:
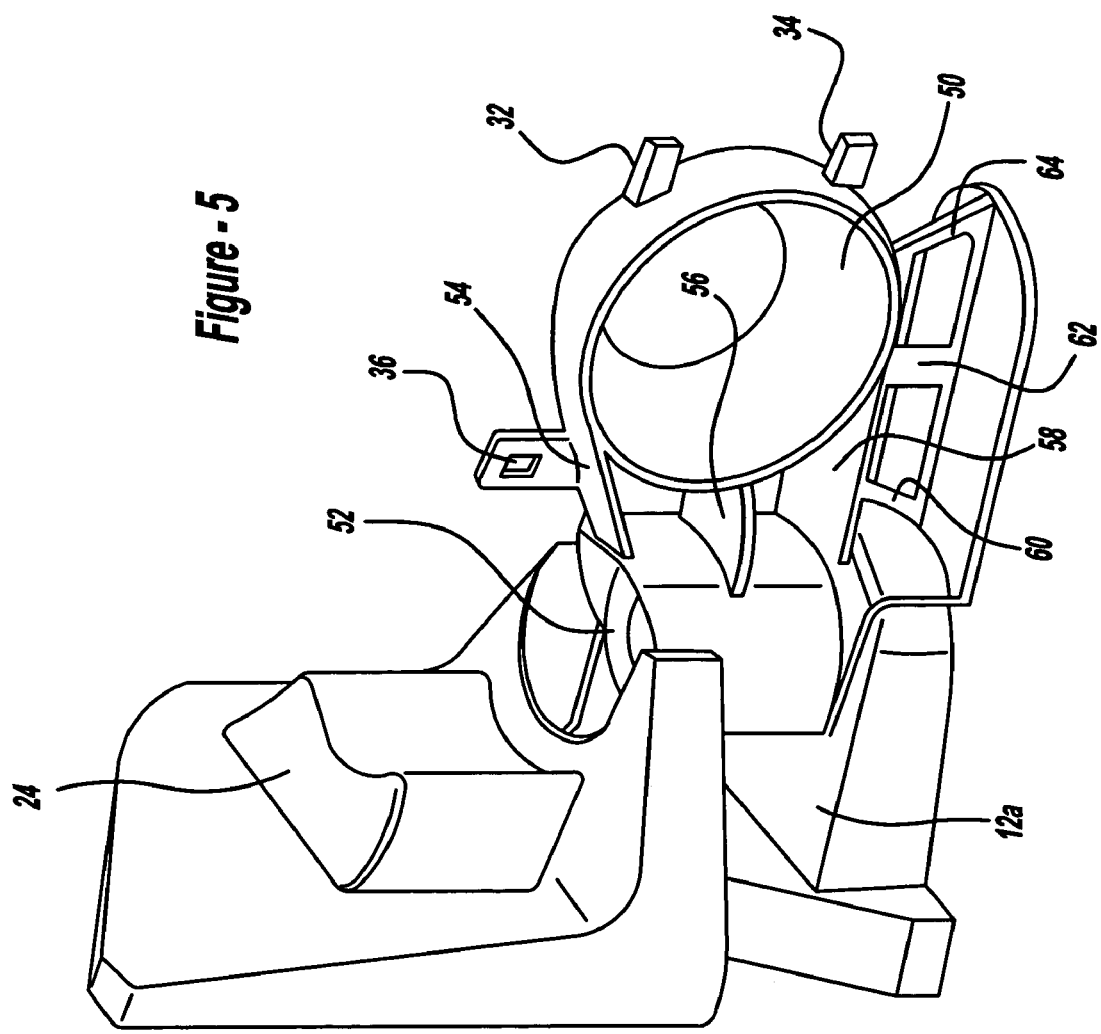
FIG. 5 is a perspective view showing attachment of the cover over the attachment support member.

Similarly, an attachment cover 24 slides over the mounting bracket 12a. Mounting bracket 12a includes a tang 38. Tang 38 includes a slot therein which engages a "T" shaped attachment protrusion extending from the inside cover 24. The "T" shape is slid into the groove as the cover is moved down over the mounting bracket 12a, as shown in FIG. 5. Additionally, the mounting bracket 12a includes attachment holes at which fasteners can be inserted during sliding of cover downward, such as shown in FIG. 5.

As set forth above, the mirror support portion 12 includes a connection portion 52 for connection with the vehicle. As shown, this can be mechanical folding type connection or it could be a fixed attachment. Alternatively, a power fold mechanism may be utilized in the design.

Additionally, the skeletal framework creating the rounded aperture 50 provides a mounting location for the mirror adjustment module (46 or 48). Preferably, horizontal ribs 54, 56 and 58 and vertical ribs 60, 62 and 64 provide the skeletal structure for supporting the framework and the overlying covers 16, 18 or 20. However, the skeletal structure shown in FIG. 1 can also be utilized for structural support. As shown in FIG. 1, this framework includes a pair of crossed support members 66 and 68 which support the mirror adjustment module. A horizontal rib 70 with a series of three cutouts is provided for attachment to the lower plate 28.

In operation, appearance of the mirrors may be changed as desired, depending on the application. Additionally, if certain features are desired, such as turn signals, flood lights, puddle lights, spot lights, proximity sensors, speakers, intercoms, microphones, warning lights, temperature sensors or the like, can be incorporated into the mirror or attachment potion 28a of the cover and then interchanged on the vehicle, either during manufacture or later at the dealer. These features are mountable either on the cover portion or the underlying frame. Thus, appearance features, colors and shape may be easily customized using the present invention.

This modular functionality allows a variety of feature configurations. Thus, this system allows manufacturers consistent attachment and performance, which can be used on various vehicle platforms. It is only necessary to design the outer covers to match the door and type of mirror and choose the desired options. The modular nature allows low cost facelift opportunities for simplistic design changes. Low development costs for follow on program opportunities are achieved. Also, this system allows for reduced time to launch a new design, less engineering and test resources required, reduced tooling cost, and reduced capital investment. Thus, several manufacturing and mass production benefits are achieved while offering unique styling, appearance and features.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of attaching an interchangeable cover to a mirror housing, comprising:
   providing a mirror support framework having a portion thereof being an outside show surface of the mirror housing, wherein said mirror support frame work has a first fixed securement structure formed on an exterior surface thereof and a tang formed on said exterior surface;
   providing a first interchangeable outer cover member having an opening formed therein, which is adapted to surround the portion for forming a substantially continuous surface, and the first interchangeable outer cover member being slidable over the mirror support framework for providing an outer cover to the mirror housing;
   providing a substantially vertical receiving structure formed on the interior surface of said first interchangeable outer cover member;
   installing said first interchangeable outer cover member over the mirror support framework by engaging said first fixed securement structure to said substantially vertical receiving structure;
   providing a mounting bracket portion for attachment to a vehicle, including an underlying framework having a second fixed securement surface formed on the surface of said mounting bracket portion;
   providing a second interchangeable outer cover member for changing the stylistic appearance of said mounting bracket portion, wherein said second interchangeable outer cover member has an attachment protrusion formed on an interior surface of said second interchangeable outer cover member; and
   installing said second interchangeable outer cover member to said mounting bracket portion by engaging said attachment protrusion to said tang.

2. The method of claim 1, wherein the mirror support framework and the bracket mounting portion are foldably attached with respect to one another.

3. The method of claim 2, wherein said foldable attachment is interchangeable between a manual fold mechanism and a powerfold module.

4. The method of claim 1, further comprising providing a plurality of first interchangeable outer cover members for filling over said mirror support framework and a plurality of second interchangeable outer cover members for filling over said mounting bracket and selecting a particular style of said plurality of said first outer cover members and said plurality of said second outer cover members and attaching said selection to said mirror housing for filling over said mirror support framework and selecting a particular style and attaching it to said mirror support framework.

5. The method of claim 1, wherein said mirror support framework includes a control module accepting portion thereof for receiving an interchangeable mirror control module, providing an interchangeable support module, and snap fitting the module into said mirror support framework prior to installing said first interchangeable outer cover member.

6. The method of claim 1, wherein said portion thereof being an outside show surface forms a bottom portion of the mirror housing.

7. A mirror system comprising:
   a first outer decorative cover portion having an area defining a first aperture;
   a second outer decorative cover portion having an area defining a second aperture;

a single structural member adapted for attachment to a vehicle, said structural member including a mounting bracket and a mirror support;

wherein said mirror support is operable to be received through said first aperture such that said first decorative cover portion is operable to cover a first portion of said mirror support;

wherein said mounting bracket is operable to be received through said second aperture such that said second decorative cover portion is operable to cover a second portion of said structural member; and wherein said mirror support is operable to support a mirror member, said mirror support including a portion for receiving a mirror adjustment module therein;

wherein said structural member includes a first fixed securement structure formed on an exterior surface thereof and a tang formed on said exterior surface;

wherein said mounting bracket includes a second fixed securement structure formed on an exterior surface thereof;

wherein the first fixed securement structure is operable to engage a substantially vertical receiving structure formed on an interior surface of the first decorative cover portion and the second securement structure has an attachment protrusion formed on an interior surface of the second decorative cover portion for engaging said tang;

wherein either the first or second decorative cover portion are interchangeable with respective first or second decorative cover portions.

8. The mirror system of claim 7, wherein said structural member is a skeletonized support structure for supporting said mirror and either of said first and second outer decorative cover portions.

9. The mirror of claim 7, wherein said single structural member and said mirror support are foldable with respect to one another.

10. The mirror system of claim 9, wherein said folding mechanism can be interchanged between a manual fold and power fold mechanism.

11. The mirror system of claim 7, wherein said mirror member is manually adjustable in said mirror support.

12. The mirror system of claim 11, wherein said mirror member is remotely adjustable from inside the vehicle.

13. The mirror system of claim 7, wherein said mirror member is electronically adjustable from inside the vehicle.

14. The mirror system of claim 7, wherein a bottom portion of said bracket forms an outer surface of a mirror housing.

15. The mirror system of claim 7, wherein said mirror support receives a generic module which is inserted for providing a manually top type adjustable mirror, an electronically adjustable mirror, a remote manually adjustable mirror, or an electrically adjustable mirror with memory.

16. The mirror system of claim 8, wherein said skeletonized support structure accepts a cover portion selected from a plurality of different designs of cover portions having a commonly configured attachment securement structure.

17. A mirror system having interchangeable component parts, comprising:

a skeletonized mirror support structure for supporting a mirror control module having a mirror attached to said skeletonized mirror support structure;

said skeletonized mirror support structure being configured for supporting one of a plurality of mirror control modules having pre-selected features;

said skeletonized mirror support structure has a first fixed securement structure formed on an exterior surface thereof for attaching one of a plurality of first cover members using a substantially vertical receiving structure formed on the interior surface of each said first plurality of cover members;

an adaptable folding mechanism for providing folding between a bracket and said skeletonized mirror support structure, wherein said folding mechanism is adaptable for configuration between a manually foldable configuration and a power foldable configuration while maintaining the configuration of the skeletonized mirror support structure and the bracket structure;

a mounting bracket structure adaptable for attachment to a vehicle;

said bracket structure including a second fixed securement structure formed on an exterior surface of said mounting bracket structure; and said second fixed securement structure allowing attachment of a second outer cover selected from a plurality of second outer covers using a tang formed on the exterior of said first fixed securement structure and an attachment protrusion formed on the interior surface of said second outer cover.

* * * * *